T. S. C. LOWE
Ice Machine.
No. 63,404.
Patented April 2, 1867.
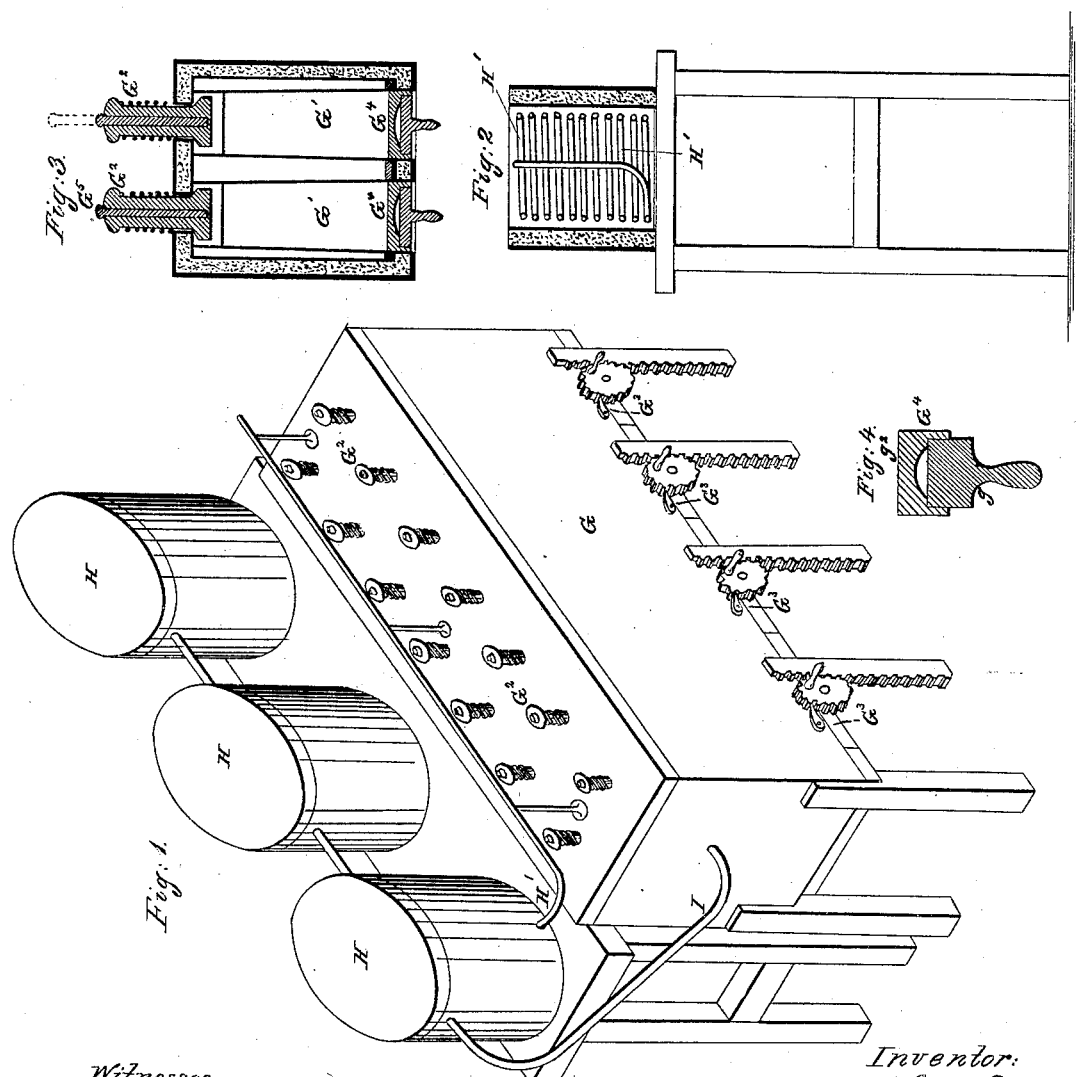
Witnesses:
Inventor:

United States Patent Office.

THADDEUS S. C. LOWE, OF NEW YORK, N. Y.

*Letters Patent No. 63,404, dated April 2, 1867.*

---

IMPROVEMENT IN APPARATUS FOR THE MANUFACTURE OF ICE.

---

*The Schedule referred to in these Letters Patent and making part of the same.*

---

TO ALL WHOM IT MAY CONCERN:

Be it known that I, THADDEUS S. C. LOWE, of the city, county, and State of New York, have invented a new and useful Improvement in Apparatus for Manufacturing Ice; and I do hereby declare that the following is a full, clear, and exact description of the same, reference being had to the annexed drawings, making part of this specification, in which—

Figure 1 is a perspective view.
Figure 2 is a vertical section of the water-cooler.
Figure 3 is a vertical transverse section of the expansion-chamber; and
Figure 4 is a vertical section of the stopper.
The same letters are employed in all the figures in the indication of parts which are identical.

The subject-matter of this application is the expansion-chamber and water-cooler of my apparatus for manufacturing ice, upon which an application is now pending; but its use is not limited to my peculiar process of manufacture as therein claimed, but it is equally applicable to other processes, and I shall therefore claim so much as is new in this apparatus, however applied to use. G is the expansion-chamber, in which the frigorific effects are produced by the expansion of condensed gases or volatile liquids. I employ in my process carbonic acid gas, first condensed by mechanical pressure to the form of a liquid, and then, the pressure being withdrawn, allowed to resume its normal state by expansion within the chamber G. Other gases, such as ammoniacal gas, or volatile liquids, such as ether, evaporated under exhaustion, have been employed in other processes, and may be used in this apparatus. In the other processes the frigorific effects are produced by cooling non-congealable liquids, and then causing them to flow around vessels containing the substances to be cooled or frozen. One of my improvements consists in bringing the cold vapors or gas into immediate contact with the vessels containing the water or other substances to be cooled or frozen. The expansion-chamber is therefore hermetically closed; and, to prevent waste by the effect of external heat, I form the casing thereof with double sides, ends, top, and bottom, and fill the intermediate space (say six or eight inches through) with closely pressed raw wool. Within this chamber I place cylindrical pipes $G^1$, which I shall call the freezers. These are made, in my apparatus, of sheet copper, highly polished on the inside. Where ammoniacal gases or other substances are employed which would act chemically on the copper, it must be coated, or other metals substituted. I prefer copper because of its composition, cheapness, and its being an excellent conductor of heat. The freezers $G^1$ are covered above, having only an opening large enough to receive the plunger $G^2$, which is supported by a spiral spring, but may be pushed down so as to start the block of ice when formed in the freezer. There is a hole through the plunger $G^2$ through which water may be introduced into the freezer. This hole is closed by the plug $G^5$. To facilitate the withdrawal of the block of ice when formed, the freezer is made to expand in diameter gradually from top to bottom, and it is closed by the stopper $G^4$. In order to permit the expansion of the water when forming into ice, which might otherwise injure the sides of the freezer, this stopper should be made elastic so as to yield to this expansion. To this end it may be formed as shown in fig. 4. The part $G^2$ is made of India rubber, fitting the mouth of the freezer tightly; it rests upon the wooden piece $G^1$ which enters a cavity formed in the base of the rubber, but not entirely filling the same, so that an air-chamber may be left between the wood plug and elastic stopper. These plugs are held in place by the falling-doors $G^3$. The water is supplied to the freezers from the water-coolers H, through a pipe which may be so constructed as to fill as many of the freezers at the same time as may be desired. For convenience I propose to construct the expansion-chamber with several falling-doors under the freezers, so that while the attendants are removing the ice from one set of freezers, the others may not be open to the atmosphere. As the gas or vapor is raised in temperature by taking up the heat from the water, its place should be supplied by new and colder gas or vapor, by the admission of which it is driven or drawn by a pump, or by the force of both combined, through the pipe I. In order to utilize this gas or vapor, which is very cold, I form the pipe I in coils in a series of tubs or tanks, H, filled with water. These tanks communicate by open pipes, the water flowing through the series in the reverse direction to that of the escaping gas or vapor from the chamber G. Their action should be so regulated that the water in the tank from which the pipe $H^1$ supplies the freezers should be brought as near as possible to, but not allowed to fall below, the temperature of 32° Fahrenheit. The water, being thus nearly at a freezing temperature, should be slowly admitted into the freezers, and it will freeze almost if not quite as fast as it enters. The pipe I, after passing through the cooling tanks, communicates directly with the pump or intermediately with a gasometer. The tanks should be protected in the same manner as the expansion-chamber against external heat.

Having fully explained my improved apparatus, what I claim as new, and as of my invention, and desire to secure by Letters Patent, is—

1. The expansion-chamber G, in an apparatus for manufacturing ice by artificial process, when constructed with fixed freezers $G^1$, around and in immediate contact with which the cold gas or vapor circulates, substantially as described.

2. In such an apparatus, fixed freezers $G^1$, in combination with plungers $G^2$, arranged to operate substantially as and for the purpose set forth.

3. The elastic stoppers $G^4$, when used for the purpose and substantially as set forth.

4. The combination of fixed freezers $G^1$, elastic stoppers $G^4$, and falling-doors $G^3$, or their equivalents, substantially as and for the purpose set forth.

5. In combination with the expansion-chamber G, the eduction pipe I, and water-tanks H, enclosing the same for the utilization of the cold gas or vapor passing from the expansion-chamber, so as to reduce the temperature of the water before entering the freezers, substantially as set forth.

In testimony whereof I have signed my name to this specification in the presence of two subscribing witnesses.

T. S. C. LOWE.

Witnesses:
   R. MASON,
   C. F. CLAUSEN.